(12) United States Patent
Gulati et al.

(10) Patent No.: US 11,564,210 B2
(45) Date of Patent: *Jan. 24, 2023

(54) TWO STAGE CONTROL CHANNEL FOR PEER TO PEER COMMUNICATION

(71) Applicant: QUALCOMM Incorporated, San Diego, CA (US)

(72) Inventors: Kapil Gulati, Belle Mead, NJ (US); Arjun Bharadwaj, Cupertino, CA (US); Sudhir Kumar Baghel, Hillsborough, NJ (US); Tien Viet Nguyen, Bridgewater, NJ (US); Wanshi Chen, San Diego, CA (US); Shailesh Patil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,644

(22) Filed: May 10, 2021

(65) Prior Publication Data

US 2021/0329615 A1 Oct. 21, 2021

Related U.S. Application Data

(63) Continuation of application No. 16/803,599, filed on Feb. 27, 2020, now Pat. No. 11,006,395.

(Continued)

(51) Int. Cl.
*H04W 72/04* (2009.01)
*H04L 5/00* (2006.01)
*H04W 72/08* (2009.01)

(52) U.S. Cl.
CPC ....... *H04W 72/0406* (2013.01); *H04L 5/0048* (2013.01); *H04W 72/08* (2013.01)

(58) Field of Classification Search
CPC ............ H04W 72/0406; H04W 72/08; H04W 72/042; H04W 72/02; H04L 5/0048;
(Continued)

(56) References Cited

U.S. PATENT DOCUMENTS 9,876,609 B2 * 1/2018 Walton .................. H04L 27/261
2017/0111886 A1 * 4/2017 Kim .................... H04W 72/042
(Continued)

OTHER PUBLICATIONS

Ericsson: "Details on Physical Layer Structure for SL V2X", 3GPP Draft, 3GPP TSG-RAN WG1 Meeting# ah-1901, R1-1901211, Ericsson—Details on Physical Layer Structure for SL V2X, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21-25, 2019, Jan. 11, 2019 (Jan. 11, 2019), XP051576740, 13 pages, Retrieved from the Internet: URL: http://www.3gpp.org/ftp/tsg%5Fran/WG1% 5FRL1/TSGR1%5FAH/NR%5FAH%5F1901/Docs/R1%2D1901211% 2Ezip. [retrieved on Jan. 11, 2019].

(Continued)

*Primary Examiner* — Wutchung Chu
(74) *Attorney, Agent, or Firm* — Patterson & Sheridan, L.L.P

(57) ABSTRACT

Aspects of the present disclosure provide a method for wireless communications by a peer device. The method generates control information to schedule peer-to-peer communication. The control information includes a first portion with a first set of data and a second portion with a second set of data. The method then transmits the first portion of the control information in a first stage using first time and frequency resources. The first portion indicates a control information format of the second portion. The method further transmits the second portion of the control information in a second stage using second time and frequency resources and the indicated control information format.

26 Claims, 12 Drawing Sheets

Related U.S. Application Data

(60) Provisional application No. 62/826,878, filed on Mar. 29, 2019.

(58) Field of Classification Search
CPC ... H04L 1/1822; H04L 1/1896; H04L 5/0094; H04L 5/0053
See application file for complete search history.

(56) References Cited

U.S. PATENT DOCUMENTS

| | | | |
|---|---|---|---|
| 2018/0076994 A1* | 3/2018 | Lee | H04L 27/261 |
| 2018/0132168 A1* | 5/2018 | Ingale | H04W 72/042 |
| 2018/0227886 A1* | 8/2018 | Chou | H04B 7/0695 |
| 2018/0234220 A1* | 8/2018 | Yasukawa | H04W 72/02 |
| 2018/0302889 A1* | 10/2018 | Guo | H04B 7/088 |
| 2018/0343626 A1* | 11/2018 | Li | H04W 52/286 |
| 2019/0075546 A1* | 3/2019 | Yasukawa | H04W 92/18 |
| 2019/0098617 A1* | 3/2019 | Li | H04W 74/008 |
| 2019/0132834 A1* | 5/2019 | Yan | H04L 1/1812 |
| 2019/0223094 A1* | 7/2019 | Ingale | H04W 56/001 |
| 2019/0261398 A1* | 8/2019 | Golitschek Edler von Elbwart ... H04W 72/0446 |
| 2019/0306923 A1* | 10/2019 | Xiong | H04L 27/261 |
| 2019/0349153 A1* | 11/2019 | Li | H04W 72/087 |
| 2020/0022175 A1* | 1/2020 | Xiong | H04L 1/1861 |
| 2020/0029318 A1* | 1/2020 | Guo | H04W 72/042 |
| 2020/0037314 A1* | 1/2020 | Xiong | H04L 5/0091 |
| 2020/0053528 A1* | 2/2020 | Wang | H04L 5/0044 |
| 2020/0068605 A1* | 2/2020 | Golitschek Edler von Elbwart ... H04W 72/1268 |
| 2020/0100215 A1* | 3/2020 | Li | H04W 74/002 |
| 2020/0106566 A1* | 4/2020 | Yeo | H04W 28/04 |
| 2020/0112982 A1* | 4/2020 | Li | H04L 1/1819 |
| 2020/0120545 A1* | 4/2020 | Li | H04W 28/26 |
| 2020/0127796 A1* | 4/2020 | Li | H04W 72/14 |
| 2020/0260472 A1* | 8/2020 | Ganesan | H04L 1/08 |
| 2020/0266857 A1* | 8/2020 | Hwang | H04L 1/1819 |
| 2020/0280398 A1* | 9/2020 | Hwang | H04W 72/0446 |
| 2020/0288435 A1* | 9/2020 | Kwak | H04W 4/40 |
| 2020/0288486 A1* | 9/2020 | Kwak | H04W 72/0406 |
| 2020/0305127 A1* | 9/2020 | Huang | H04W 72/0446 |
| 2020/0314830 A1 | 10/2020 | Gulati et al. | |
| 2020/0314940 A1* | 10/2020 | Park | H04W 4/40 |
| 2021/0204250 A1* | 7/2021 | Ashraf | H04W 72/02 |
| 2022/0104238 A1* | 3/2022 | Aiba | H04L 5/0053 |
| 2022/0109527 A1* | 4/2022 | Hwang | H04L 5/0055 |
| 2022/0150937 A1* | 5/2022 | Kim | H04W 52/146 |
| 2022/0180748 A1* | 6/2022 | Kwak | G08G 1/16 |
| 2022/0191831 A1* | 6/2022 | Park | H04L 1/1812 |

OTHER PUBLICATIONS

Ericsson: "On 2-Stage PSCCH Design", 3GPP Draft, 3GPP TSG-RAN WG1 Meeting #95, R1-1813648, Ericsson—On 2-Stage PSCCH Design, 3rd Generation Partnership Project (3GPP), Mobile Competence Centre, 650, Route Des Lucioles, F-06921 Sophia-Antipolis Cedex, France, vol. RAN WG1, No. Spokane, WA, US, Nov. 12-16, 2018, Nov. 2, 2018 (Nov. 2, 2018), XP051479989, 4 pages, Retrieved from the Internet: URL: http://www.3gpp.org/ftp/tsg%5Fran/WG1%5FRL1/TSGR1%5F95/Docs/R1%2D1813648%2Ezip. [retrieved on Nov. 2, 2018].

GUO U.S. Appl. No. 62/790,732, filed Jan. 10, 2019.

HUAWEI: "Email Discussion [86b-23] On Multi-Steps DL Control Channel Design", 3GPP Draft, 3GPP TSG RAN WG1 Meeting #87, R1-1611656 Email Discussion [86b-23] On Multi-Steps DL Control Channel Design V3, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14-18, 2016, Nov. 14, 2016 (Nov. 14, 2016), XP051190942, 14 pages, Retrieved from the Internet: URL: http://www.3gpp.org/ftp/tsg_ran/WG1_RL1/TSGR1_87/Docs/. [retrieved on Nov. 14, 2016].

Interdigital Inc: "Discussion on Physical Layer Structure for NR V2X Sidelink", 3GPP Draft, 3GPP TSG RAN WG1 #96, R1-1902595, Discussion on Physical Layer Structure for NR V2X Sidelink Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25-Mar. 1, 2019, Feb. 16, 2019 (Feb. 16, 2019), XP051600288, 9 pages, Retrieved from the Internet: URL: http://www.3gpp.org/ftp/tsg%5Fran/WG1%5FRL1/TSGR1%5F96/Docs/R1%2D1902595%2Ezip. [retrieved on Feb. 16, 2019].

International Search Report and Written Opinion—PCT/US2020/020333—ISA/EPO—dated Jun. 23, 2020.

Xiong et al., U.S. Appl. No. 62/688,860, filed Jun. 22, 2018.

* cited by examiner

| Fields | Num Bits | Single Stage Control |
|---|---|---|
| #Slots | 3 | 1 |
| Join Time Frequency Resource Reservation for Retransmission | 9 | 1 |
| Periodicity if Same Resource is Reserved for Future Periodic Tx | 4 | 1 |
| QoS (Probably Only Priority) | 3 | 1 |
| Control Exclusion Distance | 4 | 1 |
| Control-B Format + Aggregation Level Indicator | 4 | 0 |
| RS Pattern | 2 | 1 |
| MCS | 5 | 1 |
| Layer-1 Source ID | 8 | 1 |
| Layer-1 Destination ID | 8 | 1 |
| HARQ Process ID | 3 | 1 |
| NDI | 1 | 1 |
| RV ID | 2 | 1 |
| FFS Whether (Open Loop) Requires Information Signaling in the Sidelink | 0 | 1 |
| TM (Rank, Layers: (a) Single Port, (b) Rank-2, © SFBC | 2 | 1 |
| Zone ID for Distance Based NACK | 10 | 1 |
| NACK Distance | 5 | 1 |
| HARQ ACK/NACK Feedback Needed | 1 | 1 |
| CSI-RS | 1 | 1 |
| FFS: Additional Bits for Future Proof | 8 | 1 |
| CRC | 24 | 1 |
| Total Size | | 94 |

FIG. 6

| FIELDS | NUM BITS | SINGLE STAGE CONTROL 910 | TWO STAGE (CONTROL A) 920 | TWO STAGE (CONTROL B: GROUPCAST) 930 | TWO STAGE (CONTROL B: BROADCAST) 940 | TWO STAGE (CONTROL B: UNICAST) |
|---|---|---|---|---|---|---|
| #SLOTS | 3 | 1 | 1 | 0 | 0 | 0 |
| JOIN TIME FREQUENCY RESOURCE RESERVATION FOR RETRANSMISSION | 9 | 1 | 1 | 0 | 0 | 0 |
| PERIODICITY IF SAME RESOURCE IS RESERVED FOR FUTURE PERIODIC TX | 4 | 1 | 1 | 0 | 0 | 0 |
| QOS (PROBABLY ONLY PRIORITY) | 3 | 1 | 1 | 0 | 0 | 0 |
| CONTROL EXCLUSION DISTANCE | 4 | 1 | 1 | 0 | 0 | 0 |
| CONTROL-B FORMAT + AGGREGATION LEVEL INDICATOR | 4 | 0 | 1 | 0 | 0 | 0 |
| RS PATTERN | 2 | 1 | 0 | 1 | 1 | 1 |
| MCS | 5 | 1 | 0 | 1 | 1 | 1 |
| LAYER-1 SOURCE ID | 8 | 1 | 0 | 1 | 1 | 1 |
| LAYER-1 DESTINATION ID | 8 | 1 | 0 | 1 | 1 | 1 |
| HARQ PROCESS ID | 3 | 1 | 0 | 1 | 1 | 1 |
| NDI | 1 | 1 | 0 | 1 | 1 | 1 |
| RV ID | 2 | 1 | 0 | 1 | 1 | 1 |
| FFS WHETHER (OPEN LOOP) REQUIRES INFORMATION SIGNALING IN THE SIDELINK | 0 | 1 | 0 | 1 | 1 | 1 |
| TM (RANK, LAYERS: (A) SINGLE PORT, (B) RANK-2, © SFBC | 2 | 1 | 0 | 1 | 1 | 1 |
| ZONE ID FOR DISTANCE BASED NACK | 10 | 1 | 0 | 1 | 0 | 0 |
| NACK DISTANCE | 5 | 1 | 0 | 1 | 0 | 0 |
| HARQ ACK/NACK FEEDBACK NEEDED | 1 | 1 | 0 | 0 | 0 | 1 |
| CSI-RS | 1 | 1 | 0 | 0 | 0 | 0 |
| FFS: ADDITIONAL BITS FOR FUTURE PROOF | 8 | 1 | 1 | 1 | 1 | 1 |
| CRC | 24 | 1 | 1 | 1 | 1 | 1 |
| TOTAL SIZE | | 94 | 42 | 71 | 55 | 57 |

Problem (Some) Problem

Ok

TWO STAGE CONTROL CHANNEL FOR PEER TO PEER COMMUNICATION

CROSS-REFERENCE TO RELATED APPLICATION(S)

This continuation application claims benefit of and priority to U.S. Non Provisional patent application Ser. No. 16/803,599, filed on Feb. 27, 2020, which claims priority to U.S. Provisional Patent Application Ser. No. 62/826,878, filed on Mar. 29, 2019, herein incorporated by reference in its entirety as if fully set forth below and for all applicable purposes.

BACKGROUND

Field of the Disclosure

Aspects of the present disclosure relate generally to wireless communications systems, and more particularly, to sending control information for scheduling peer-to-peer traffic.

Description of Related Art

Wireless communication systems are widely deployed to provide various telecommunication services such as telephony, video, data, messaging, broadcasts, etc. These systems may employ multiple-access technologies capable of supporting communications with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

Such improvements may help enable "peer to peer" communication between a variety of devices, also referred to as device to device (D2D) communications. Examples of D2D communications include vehicle to everything (V2X) communications, where a vehicle may communicate with another vehicle (V2V) or a different device, such as a base station, traffic control system, or the like (all of which may help enable autonomous driving).

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved peer to peer communication.

Certain aspects of the present disclosure provide a method for wireless communications by a peer device. The method includes generating control information to schedule peer-to-peer communication, wherein the control information comprises a first portion with a first set of data and a second portion with a second set of data; transmitting the first portion of the control information in a first stage using first time and frequency resources, wherein the first portion indicates a control information format of the second portion; and transmitting the second portion of the control information in a second stage using second time and frequency resources and the indicated control information format.

Certain aspects of the present disclosure provide a peer wireless communications device. The peer wireless communication device includes a memory and a processor coupled to the memory. The processor is configured to generate control information to schedule peer-to-peer communication, wherein the control information comprises a first portion with a first set of data and a second portion with a second set of data; transmit the first portion of the control information in a first stage using first time and frequency resources, wherein the first portion indicates a control information format of the second portion; and transmit the second portion of the control information in a second stage using second time and frequency resources and the indicated control information format.

Certain aspects of the present disclosure provide a peer wireless communication device. The peer wireless communication device includes means for generating control information to schedule peer-to-peer communication, wherein the control information comprises a first portion with a first set of data and a second portion with a second set of data; transmitting the first portion of the control information in a first stage using first time and frequency resources, wherein the first portion indicates a control information format of the second portion; and transmitting the second portion of the control information in a second stage using second time and frequency resources and the indicated control information format.

Certain aspects of the present disclosure provide a non-transitory computer readable storage medium that stores instructions that when executed by a peer wireless communication device cause the peer wireless communication device to generate control information to schedule peer-to-peer communication, wherein the control information comprises a first portion with a first set of data and a second portion with a second set of data; transmit the first portion of the control information in a first stage using first time and frequency resources, wherein the first portion indicates a control information format of the second portion; and transmit the second portion of the control information in a second stage using second time and frequency resources and the indicated control information format.

Certain aspects of the present disclosure provide a method for wireless communications by a peer device. The method includes receiving, in a first stage using first time and frequency resources, a first portion of control information to schedule peer-to-peer communication, the first portion including a first set of data and an indication of a control information format of a second portion of the control information; and receiving, in a second stage using second time and frequency resources and the indication of the control information format, the second portion of the control information, the second portion comprising a second set of data.

Certain aspects of the present disclosure provide a peer wireless communications device. The peer wireless communication device includes a memory and a processor coupled to the memory. The processor is configured to receive, in a first stage using first time and frequency resources, a first portion of control information to schedule peer-to-peer communication, the first portion including a first set of data and an indication of a control information format of a second portion of the control information; and receive, in a second stage using second time and frequency resources and the indication of the control information format, the second portion of the control information, the second portion comprising a second set of data.

Certain aspects of the present disclosure provide a peer wireless communication device. The peer wireless communication device includes means for receiving, in a first stage using first time and frequency resources, a first portion of control information to schedule peer-to-peer communication, the first portion including a first set of data and an indication of a control information format of a second portion of the control information; and receiving, in a second stage using second time and frequency resources and the indication of the control information format, the second portion of the control information, the second portion comprising a second set of data.

Certain aspects of the present disclosure provide a non-transitory computer readable storage medium that stores instructions that when executed by a peer wireless communication device cause the peer wireless communication device to receive, in a first stage using first time and frequency resources, a first portion of control information to schedule peer-to-peer communication, the first portion including a first set of data and an indication of a control information format of a second portion of the control information; and receive, in a second stage using second time and frequency resources and the indication of the control information format, the second portion of the control information, the second portion comprising a second set of data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates an example of control information sent in a single transmission, in accordance with certain aspects of the present disclosure.

FIG. 9 illustrates example formats for control information sent in multiple stages, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
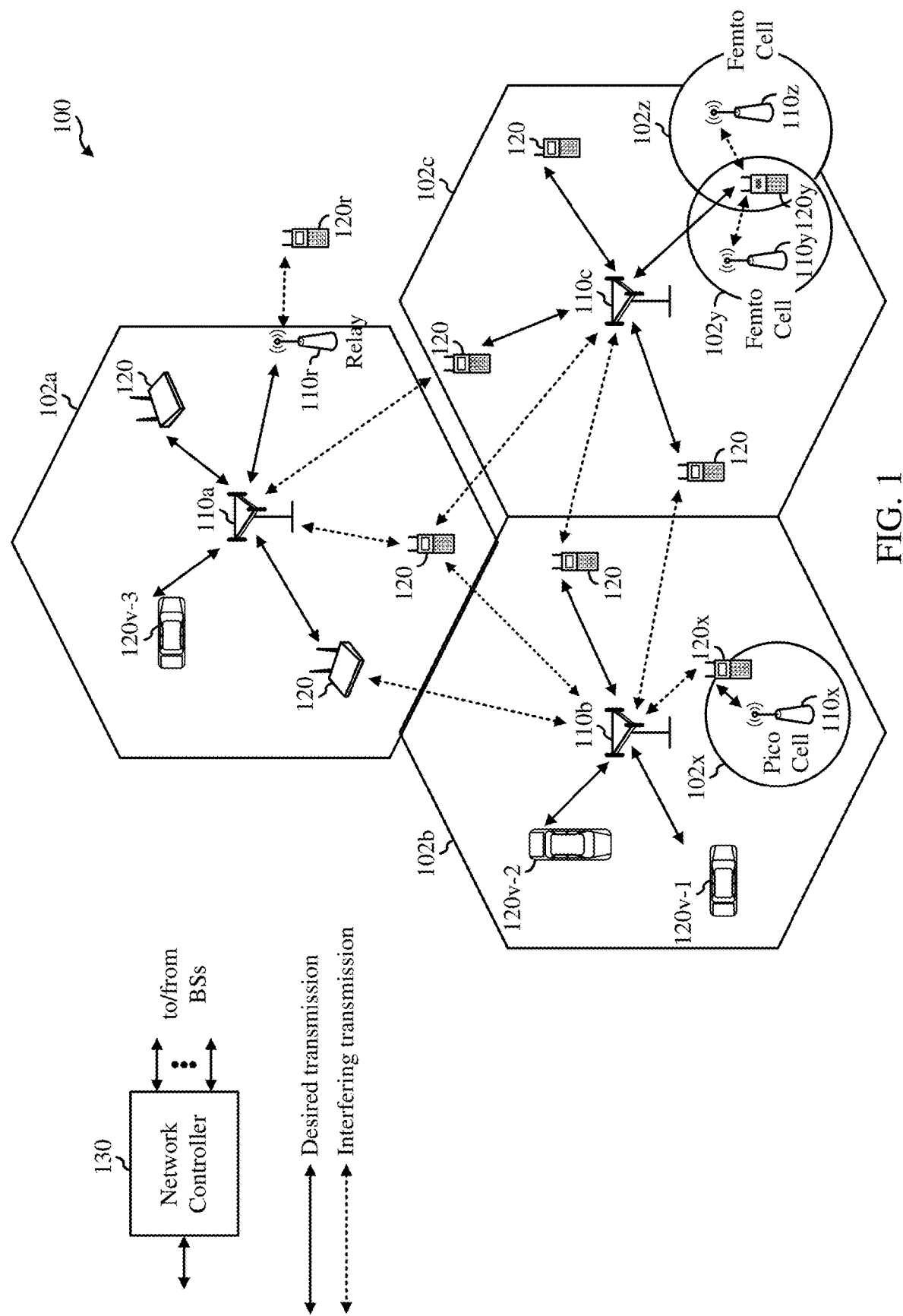
FIG. 1 is a block diagram conceptually illustrating an example telecommunications system, in accordance with certain aspects of the present disclosure.

As noted above, examples of peer-to-peer (also referred to as device-to-device or D2D) communications include vehicle to everything (V2X) communications where a vehicle may communicate with another vehicle (V2V) or a different device, such as a base station, traffic control system, or the like.

One challenge in V2X systems is to support different types of traffic. The different types of traffic require different types of control information. As a result, a single control channel format is inefficient as the payload may be too large for some types of traffic, resulting in a waste of resources. In addition a single format to schedule different types of traffic may result in a large number of blind decoding operations.

Aspects of the present disclosure may help address this challenge by sending control information for scheduling peer-to-peer (e.g. V2X) traffic in multiple stages.

The techniques presented herein may be applied in various scenarios, such as NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, techniques presented herein may help transmitting control information for scheduling peer-to-peer traffic in multiple stages. For example, base stations 110 and UEs 120 (e.g., V2V UEs, such as UE120v-1, 120v-2, and UE 120v-3) may perform operations 700 and/or 800 to send control information in multiple stages (and/or process the same).

The wireless network 100 may be, for example, a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
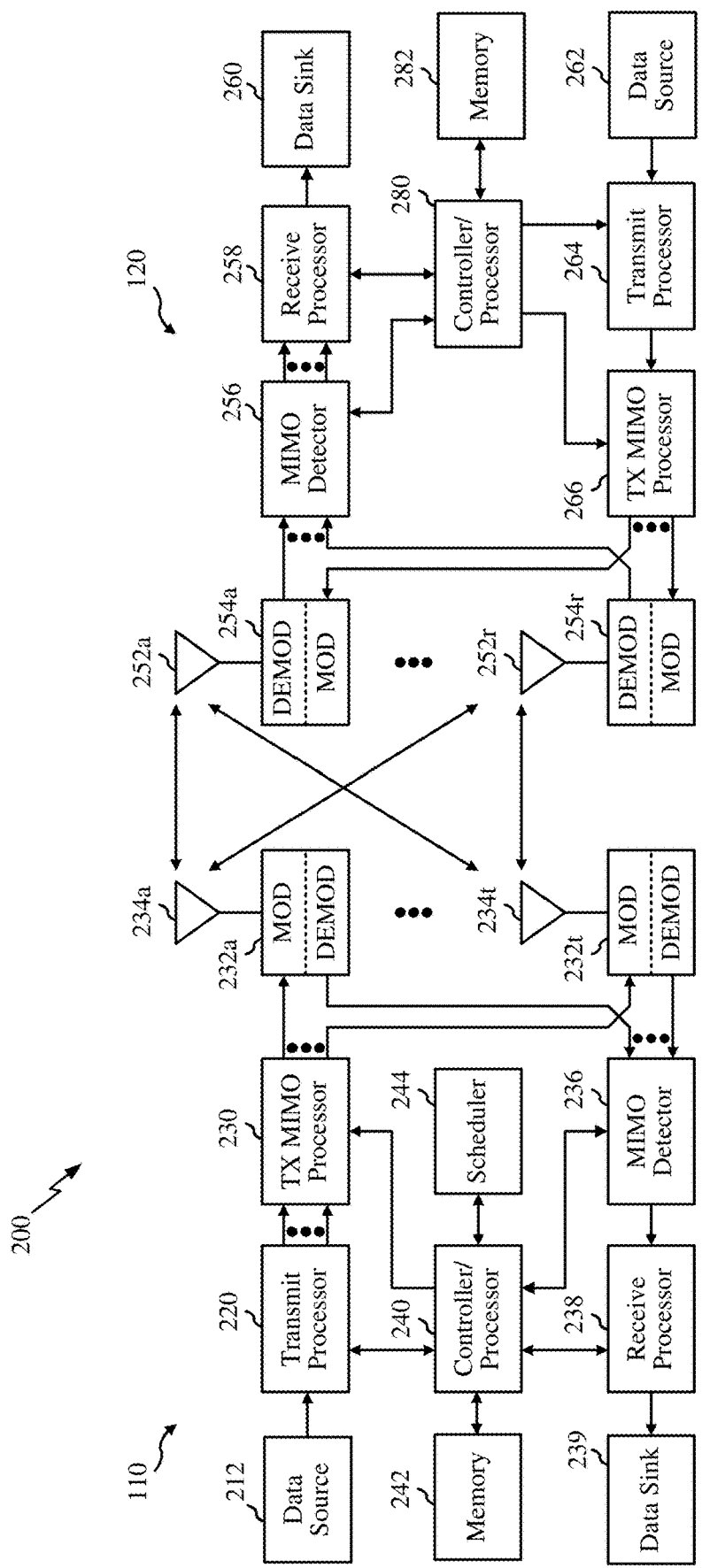
FIG. 2 is a block diagram conceptually illustrating a design of an example base station (BS) and user equipment (UE), in accordance with certain aspects of the present disclosure.

FIG. 2 illustrates example components of the gNB 110 and UE 120 illustrated in FIG. 1, which may be used to implement aspects of the present disclosure for frequency hopping for large bandwidth allocations. For example, antennas 252, Tx/Rx 222, processors 266, 258, 264, and/or controller/processor 280 of the UE 120 and/or antennas 234, processors 260, 220, 238, and/or controller/processor 240 of the gNB 110 may be used to perform the operations described herein and illustrated with reference to FIGS. 7 and 8.

FIG. 2 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 234a through 234t, and the UE 120 may be equipped with antennas 252a through 252r.

At the gNB 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the gNB 110 and may provide received signals to the demodulators (DEMODs)

254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the gNB 110. At the gNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the gNB 110 and the UE 120, respectively. The processor 240 and/or other processors and modules at the gNB 110 may perform or direct, e.g., the execution of various processes for the techniques described herein. The processor 280 and/or other processors and modules at the UE 120 may also perform or direct, e.g., the execution of the functional blocks illustrated in FIGS. 7 and 8, and/or other processes for the techniques described herein.

Figure 3:
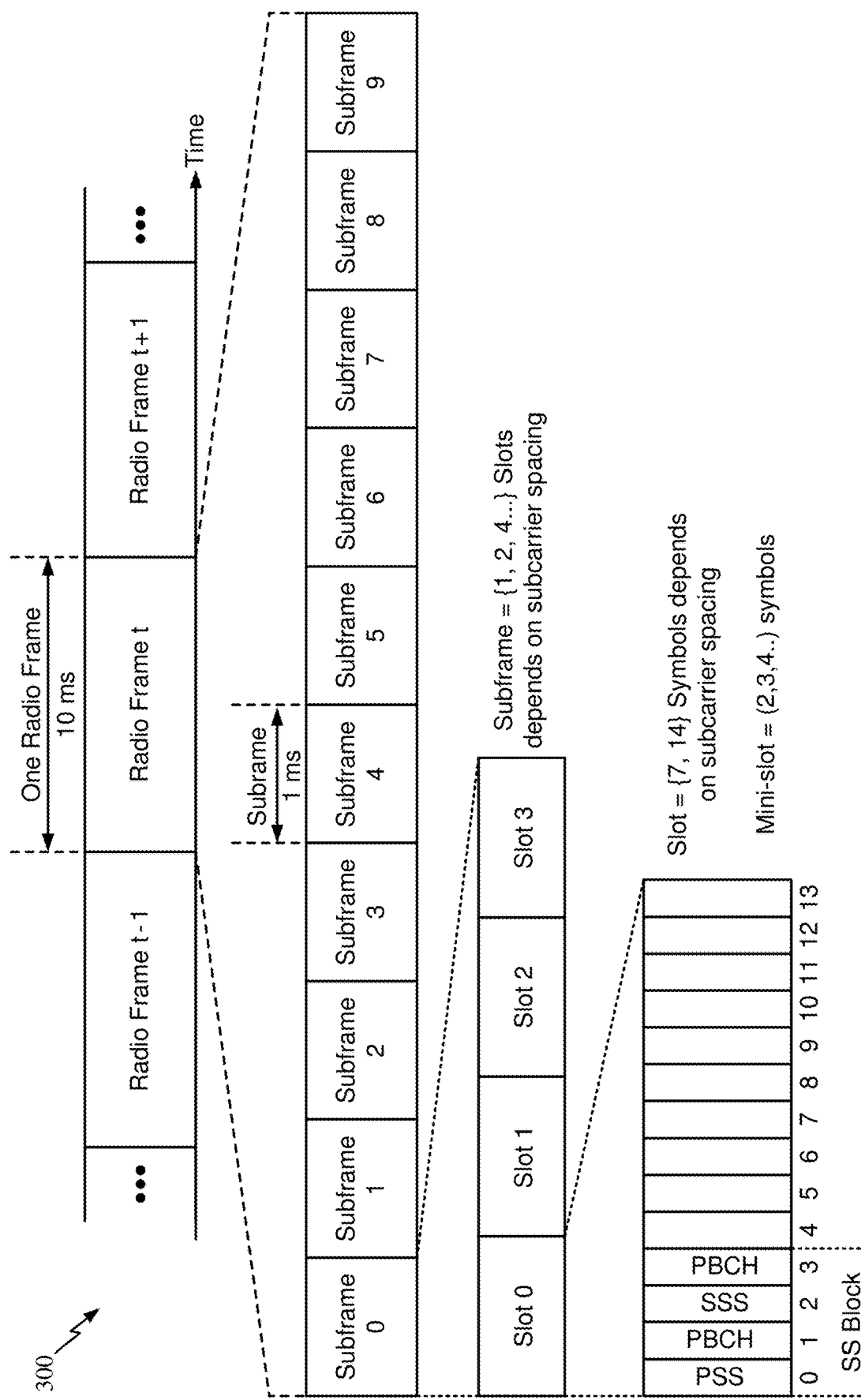
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

As noted above, LTE vehicle-to-everything (LTE-V2X) has been developed as a technology to address basic vehicular wireless communications to enhance road safety and the driving experience. In other systems, new radio vehicle-to-everything (NR-V2X) has been developed as an additional technology that covers more advanced communication use cases to further enhance road safety and driving experience. Non-limiting embodiments for frequencies covered may be, for example, 3 GHz to 5 GHz. As described below, V2X systems, methods, and apparatuses may be applicable to both LTE-V2X and NR-V2X as well as other frequencies. Other frequency spectrums other than those covered by LTE-V2X and NR-V2X are also considered to be applicable to the description and as such, the disclosure should not be considered limiting.

Figure 5:
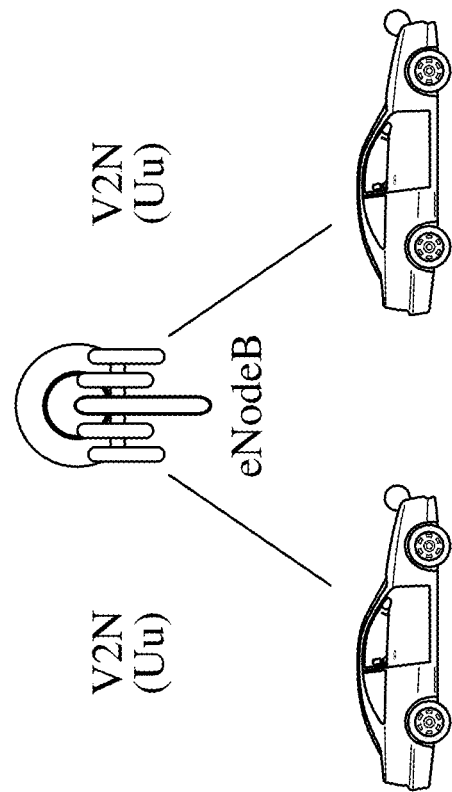
FIGS. 4 and 5 illustrate example V2X deployments, in which aspects of the present disclosure may be practiced.
Figure 4:
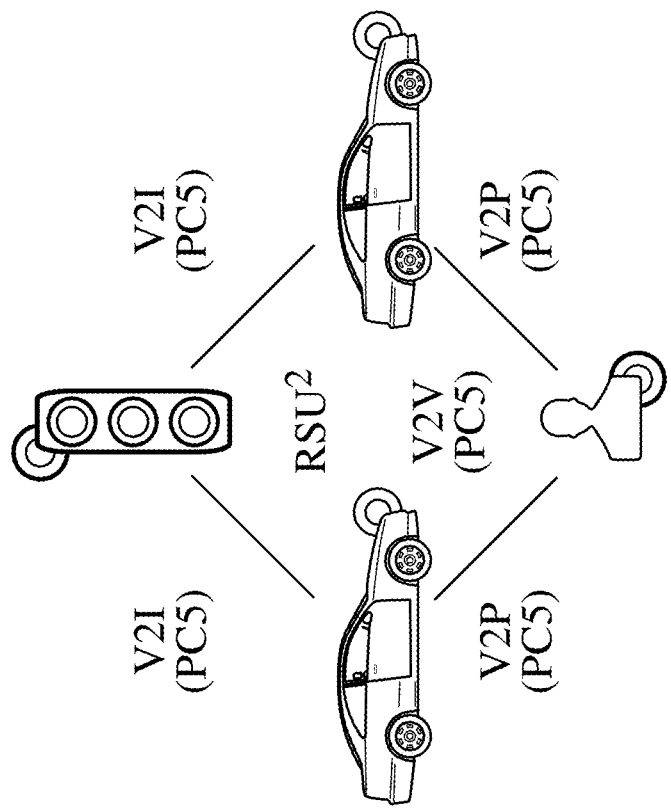

FIGS. 4 and 5 illustrate example V2X systems in which aspects of the present disclosure may be practiced. The V2X system, provided in FIGS. 4 and 5, provides two complementary transmission modes. A first transmission mode involves direct communications between participants in the local area. Such communications are illustrated in FIG. 4. A second transmission mode involves network communications through a network as illustrated in FIG. 5.

Referring to FIG. 4, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

In one, non-limiting embodiment, the V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may support advanced safety services in addition to basic safety services described above. In another non-limiting embodiment, the V2X system may be used in a 5G NR V2X configuration, which is configured to interface with a wide variety of devices. By utilizing a 5G NR V2X configuration, multi Gbps rates for download and upload may be provided. In a V2X system that uses a 5G NR V2X configuration, latency is kept low, for example 1 ms, to enhance operation of the V2X system, even in challenging environments.

Referring to FIG. 5, a second of two complementary transmission modes is illustrated. In the illustrated embodiment, a vehicle may communicate with another vehicle through network communications. These network communications may occur through discrete nodes, such as eNodeBs, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Multi-Stage Control Channel Transmission

As noted above, one challenge in V2X systems is to support different types of traffic. The different types of traffic require different types of control information. As a result, a single control channel format is inefficient as the payload may be too large for some types of traffic, resulting in a waste of resources. Further, if multiple formats are used for the single stage to reduce waste of resources, then the number of formats would be too large, thereby resulting in a large number of blind decoding attempts.

FIG. 6 illustrates one example format for sending content of a control channel, such as a Physical Sidelink Control Channel (PSCCH) to schedule traffic in a Physical Sidelink Shared Channel (PSSCH), in a single transmission, in accordance with certain aspects of the present disclosure. To cover all types of traffic, this format includes information that may not be needed for all types of traffic it schedules. For example, as will be described in greater detail below, certain information, such as Zone ID for distance based negative acknowledgement (NACK) 610, hybrid automatic repeat request (HARQ) ACK/NACK feedback 620, and channel state information-reference signal (CSI-RS) parameters 630 may not be needed for all types of traffic. Thus, sending this information when not needed is a waste of resources. As can be seen in the figure, the total payload size 640 for a single-stage control information format may be 94 bits in order to be able to carry all of the required information.

Aspects of the present disclosure may help address this challenge by sending control information for scheduling peer-to-peer (e.g. V2X) traffic in multiple stages.

Figure 7:
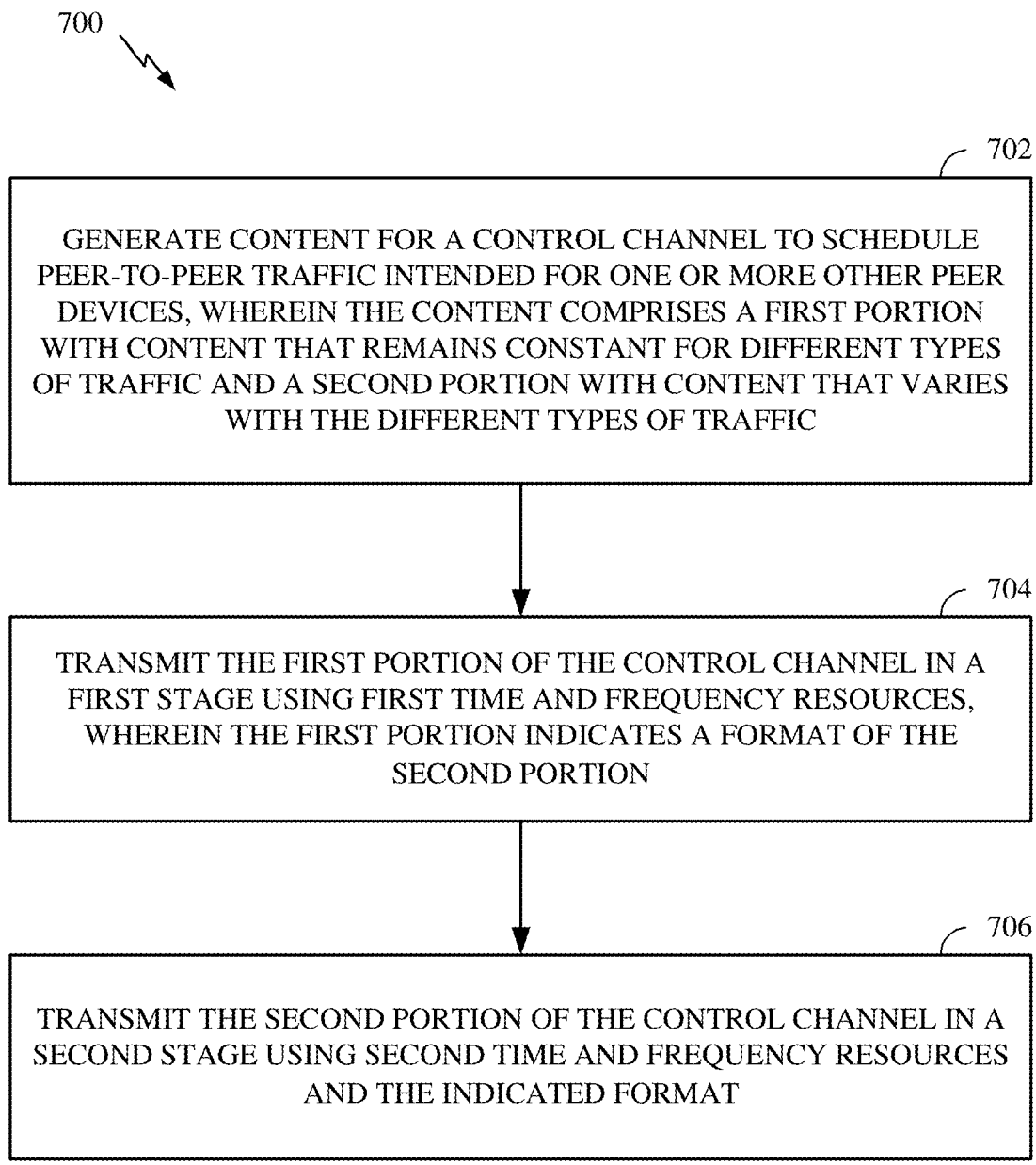
FIG. 7 illustrates example operations for a transmitting peer device (e.g., a V2X UE), in accordance with certain aspects of the present disclosure.

FIG. 7 illustrates example operations 700 for a transmitting peer device (e.g., a V2X UE), in accordance with certain aspects of the present disclosure. The operations 700 may be performed, for example, by a V2X UE 120*v* shown in FIG. 1 (e.g., to schedule peer-to-peer traffic to one or more other V2X UEs).

Operations 700 begin, at block 702, by generating content for a control channel to schedule peer-to-peer traffic intended for one or more other peer devices, wherein the content comprises a first portion with content that remains constant for different types of traffic and a second portion with content that varies with the different types of traffic. At 704, the UE transmits the first portion of the control channel in a first stage using first time and frequency resources. At 706, the UE transmits the second portion of the control channel in a second stage using second time and frequency resources.

Figure 8:
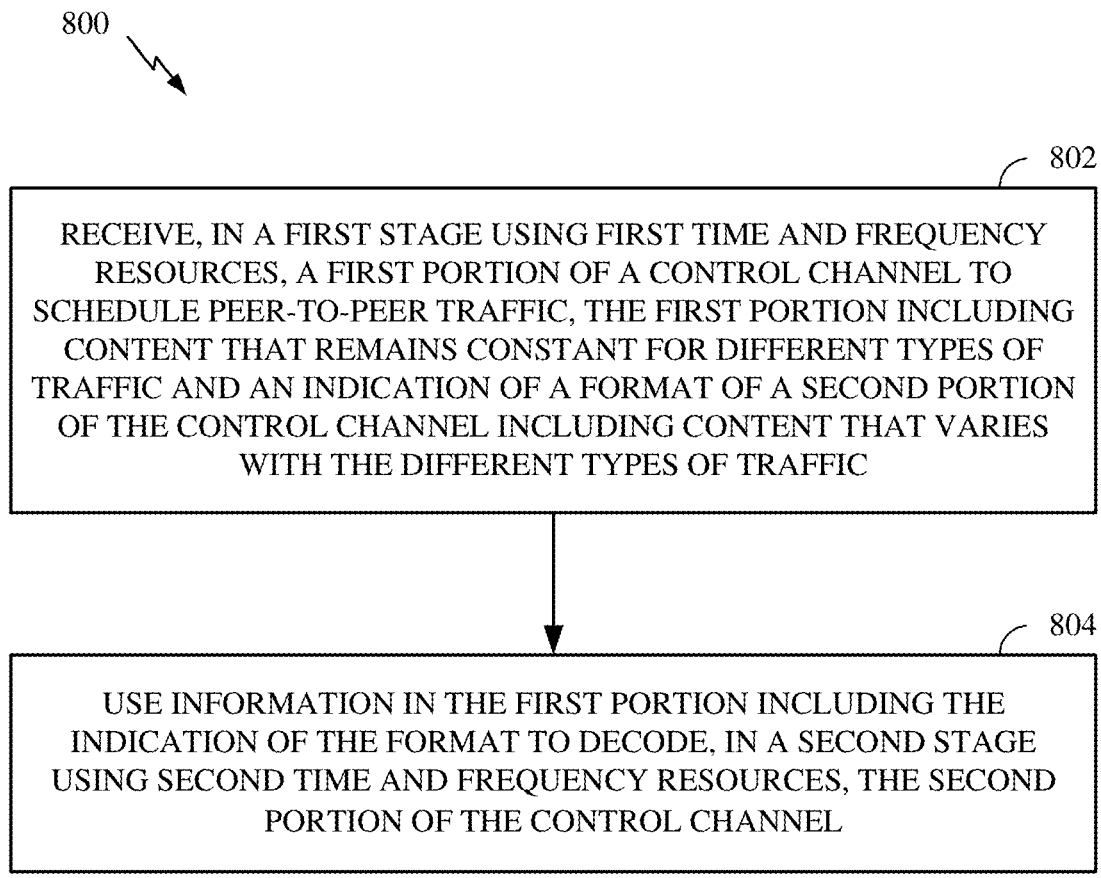
FIG. 8 illustrates example operations for a receiving peer device (e.g., a V2X UE), in accordance with certain aspects of the present disclosure.

FIG. 8 illustrates example operations 800 for a receiving peer device (e.g., a V2X UE), in accordance with certain aspects of the present disclosure. The operations 800 may be performed, for example, by a V2X UE 120*v* shown in FIG. 1 (e.g., to process a multi-stage control channel transmission sent by one or more other V2X UEs performing operations 700).

The operations 800 begin, at 802, by receiving, in a first stage using first time and frequency resources, a first portion of a control channel to schedule peer-to-peer traffic, the first portion including content that remains constant for different types of traffic. At 804, the UE uses information in the first portion to decode, in a second stage using second time and frequency resources, a second portion of the control channel, the second portion including content that varies with the different types of traffic.

A multi-stage (e.g., 2-stage) transmission as proposed herein may help accommodate future needs and may allow for different sidelink control information (SCI) formats for the second stage. FIG. 9 illustrates different formats for the second stage, each with different types of information and a different size payload.

As illustrated in FIG. 9, the first stage may include resource reservation content. In general, the multi-stage transmission splits the content of a control channel (e.g., PSCCH) into two stages, referred to herein as Control A and Control B.

In general, Control A may include content that is constant for different types of traffic (e.g., resource reservation indication-assist scheduling) and may include information that would assist in the allocation of resource of channel in an efficient way. This information may not allow a UE to decode the actual data it schedules, but may let the UE know what resources have been reserved and the like. Information needed to decode the data may be conveyed in the second stage (Control B). Control A may include information needed to decode control B, like a format indicator.

Some information may be conveyed in either Control A or Control B. For example, Control A could include a ZONE ID and/or DESTINATION ID that may define groups for Groupcast (e.g., Group ID)/Broadcast (e.g., generic like 0)/Unicast (e.g., specific ID of the receiver). A Zone ID may be indicative of location information of the transmitter. The information could also include actual location information instead (e.g., GPS coordinates) and/or a transmitter ID. A UE may decode some information, look at the ID, then know if it has to decode the rest. In some cases, a zone ID may indicate a location of transmitter (e.g., like GPS coordinates). A receiver may use this information to decide if the receiver is too far from the transmitter (e.g., and may ignore the transmission) or if the receiver is in close proximity to the transmitter so the transmission must be important.

The Control A and Control B transmissions may have different amount of protection/aggregation level/repetition (e.g., AL 3, repeating 3 times, with much better performance).

In general, the Control B information may include information that varies in content with the types of traffic (e.g., groupcast, broadcast, unicast). It may include additional information (relative to Control A) that is needed only for data decoding.

In some cases, the Control A and Control B information may be sent with different link budgets for first and second stage transmissions. For example, the second stage may not need to have more link budget than data.

By providing information for the second stage via Control A, blind decoding may only need to be performed for the first stage. This may be aided by the reduced payload and may be further aided by limiting the time and location of the Control A transmissions. As illustrated, the total decoding overhead of the first and second stages may be a bit increased relative to a single stage transmission (e.g., total payload may increase due to an additional cyclic redundancy code (CRC)). As illustrated in FIG. 9, an example control transmission may take 94 bits in one stage control 910 with 8 bits for future proof, versus 113 (e.g., the combination of control A 920 and control B 930, e.g., for group-cast traffic) or 99 bits (e.g., the combination of control A 920 and control B 940, e.g., for unicast traffic) when sent in two stages.

Figure 10:
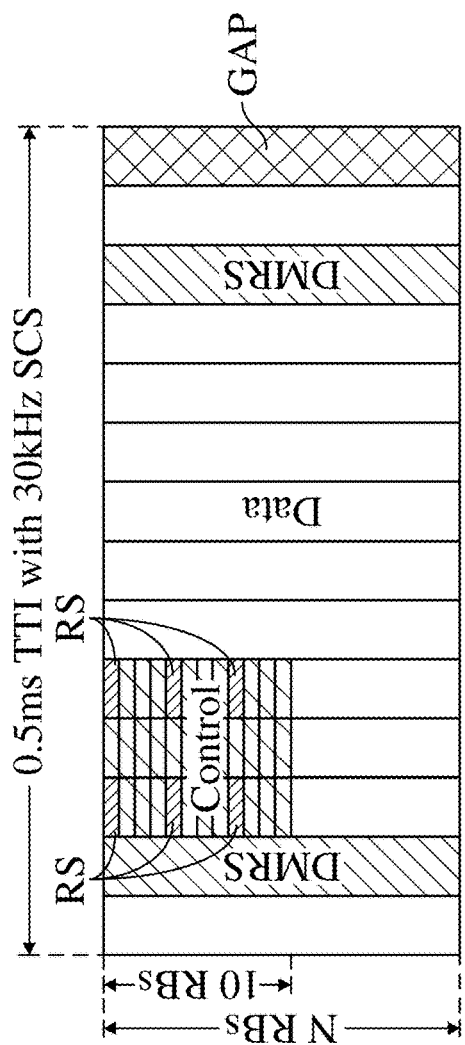
FIG. 10 illustrates example resource mapping for a single stage transmission of control information, in accordance with certain aspects of the present disclosure.

FIGS. 10 and 11 show how control and data may be multiplexed in single stage and multi-stage transmissions.

In the example shown in FIG. 10, resource mapping for single stage may be 10 resource blocks (RBs)×3 symbols, with 2 symbols with comb-4 demodulation reference signals (DMRS). This may result in a code rate of approximately 0.156 or 0.14 without reserved bits. For MCS0 for NR, the code rate may be approximately 0.11 (for table 1, 2) and approximately 0.03 (for table 3).

Figure 11C:
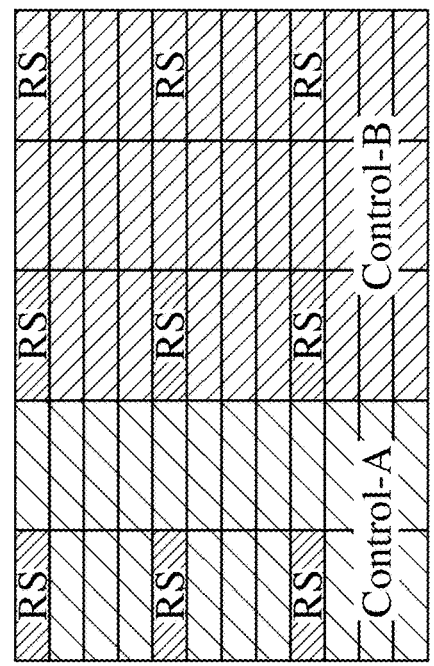
FIGS. 11A-11C illustrate example resource mapping for multi-stage transmission of control information, in accordance with certain aspects of the present disclosure.
Figure 11B:
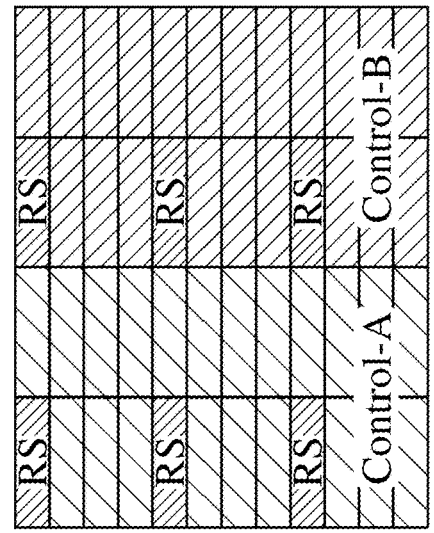
Figure 11A:
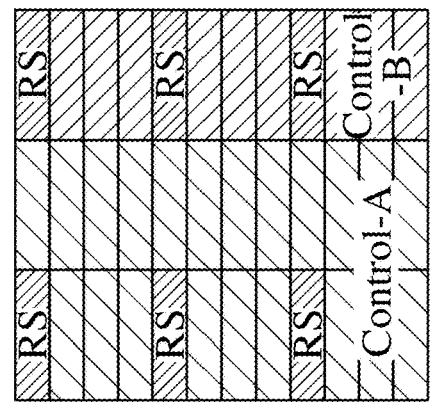
Figure 12A:
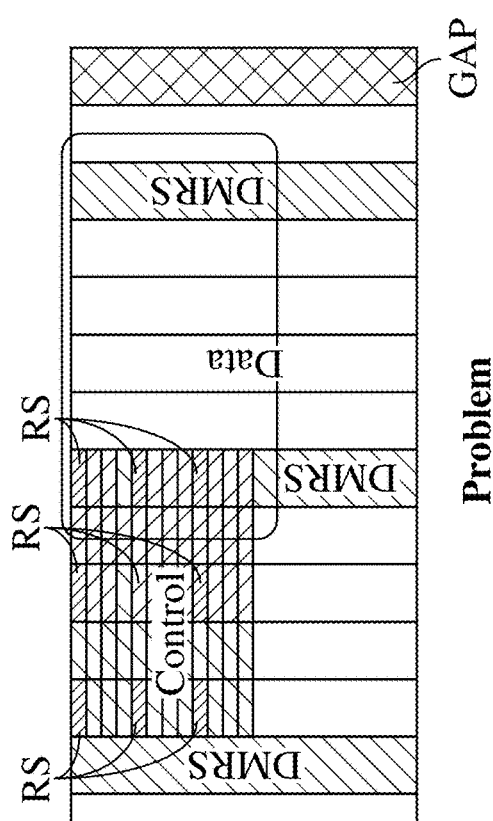
FIGS. 12A-12D illustrate example resource mapping for multi-stage transmission of control information, in accordance with certain aspects of the present disclosure.
Figure 12B:
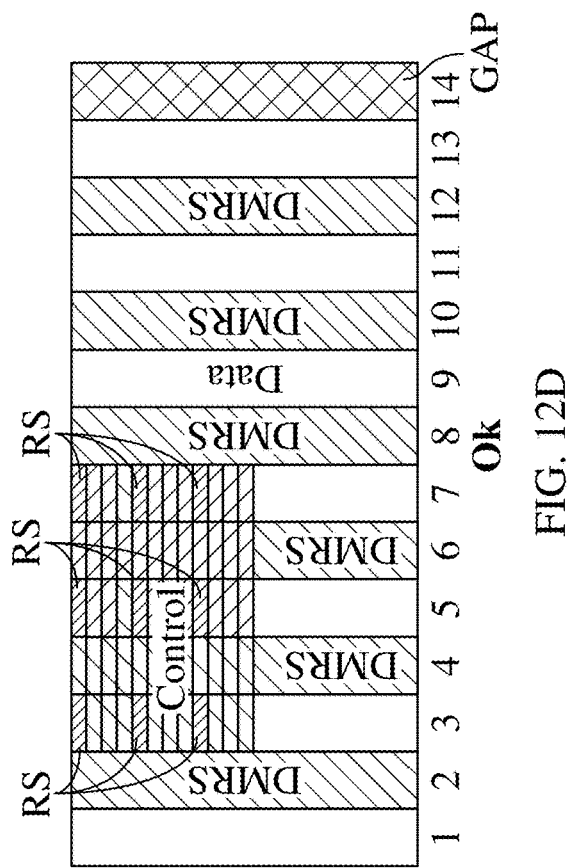
Figure 12C:
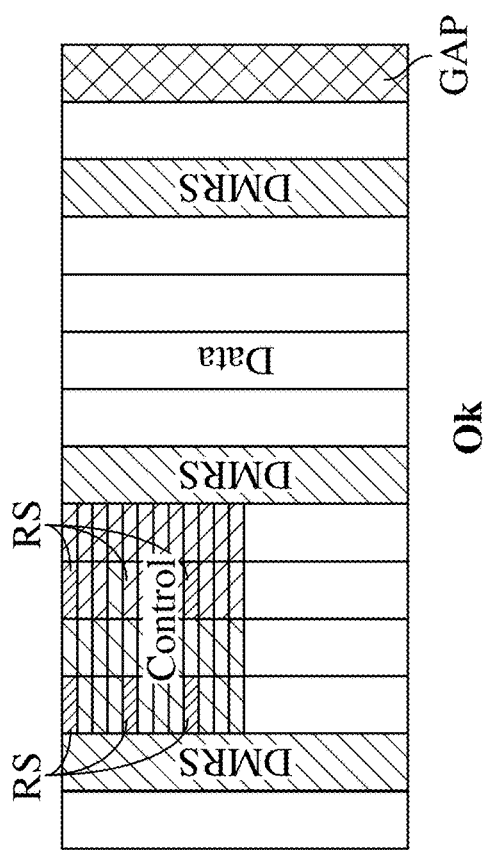
Figure 12D:
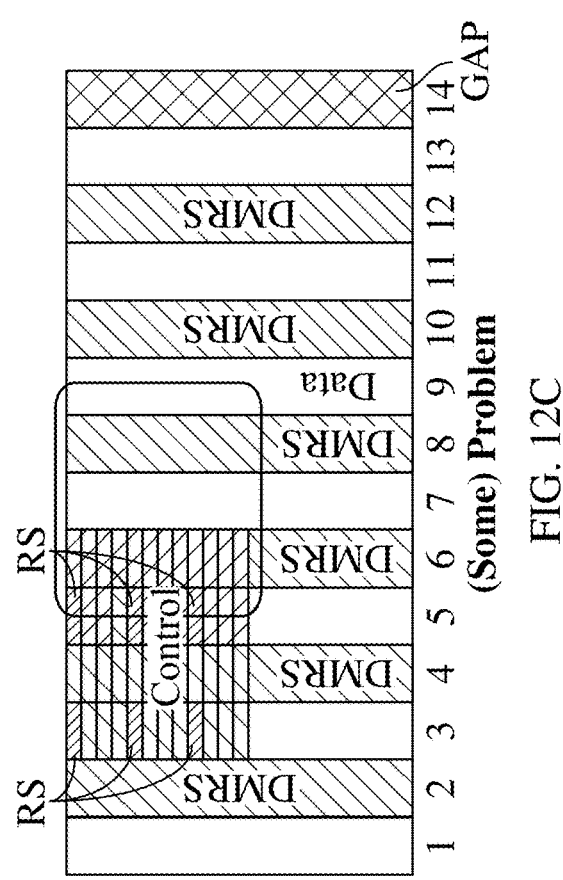

In the multi-stage examples shown in FIGS. 11A-11C, the first stage Control A information may have a target code rate, for example, of 0.1 (or less), if mapped to two symbols. In some cases, the Control A information may be limited to a single symbol. The code rate for the second stage (Control B) may vary. For example, different aggregation levels can be defined and chosen by the transmitter based on the MCS of data.

There are various options for RE mapping. For example, FIG. 11A illustrates a first option where Control B is mapped with Control A, which is somewhat similar to a single stage mapping (shown in FIG. 10). According to other options, as shown in FIGS. 11B and 11C, Control B information may be multiplexed ("piggybacked") with data (e.g., similar to uplink control information (UCI) multiplexing on PUSCH).

There are various options when Control B information is mapped together with Control A information. These options may be illustrated by considering an example of Control B Info of 72 bits (e.g., for groupcast as shown in FIG. 9). This information could be sent using 1 symbol, as shown in FIG. 11A, which may result in a code rate of approximately 0.4 (e.g., data MCS 12-28 for table 1). As another option, this information could be sent using 2 symbols, as shown in FIG. 11B, which may result in a code rate of approximately 0.17 (e.g., data MCS 2-28 for table 1). As another option, this information could be sent using 3 symbols, as shown in FIG. 11C, which may result in a code rate of approximately 0.12 (e.g., data MCS 0/1-28 for table 1).

Three aggregation levels (signaled with 2 bits) may be sufficient for many types of control B formats. Further, different Control B formats may support only certain aggregation levels (e.g. AGG3 only needed for Control B for groupcast).

There are various options for Quasi Co Location (QCL) assumption on RS for Control A and Control B. For example, for Control A, omni-like transmission may be needed. Control B information may be directed towards an intended receiver only. In unicast, if data DMRS is being pre-coded, then the Control B information may also be precoded so Control-B and data will have similar link budgets.

In some cases, multi stage transmission may support non-QCL and/or different precodings for RS on Control A and/or Control B, in general by specification, or depending on the Control B format (unicast vs. groupcast/broadcast). For groupcast/broadcast, the RS may be QCL'ed. This may present a challenge in certain cases, for example, with carrier frequency offset issues and performance under certain requirements, such as certain speeds of the transmitter and/or receiver.

As illustrated in FIGS. 12A-12D, in some cases, there may be certain problems when Control B is mapped together with Control A. For example, as illustrated in FIGS. 12 B and 12 D, problematic cases may arise if mapping Control B to more than 1 symbol depending on speed (e.g., at higher speeds, more DMRS symbols may be needed). One approach to address this problem is to not limit Control B to the same frequency allocation as Control A (e.g., 10RBs). In some cases, the size in RB may be determined, for example, by AGG level, Format, and/or the RB allocation for data. For example, for a low-code rate Control B transmission, 15 RBs may be allocated (i.e. data transmission minimum BW is 15RBs). Control B information distributed non-uniformly over frequencies may also be possible (although this may not be ideal).

Figure 13A:
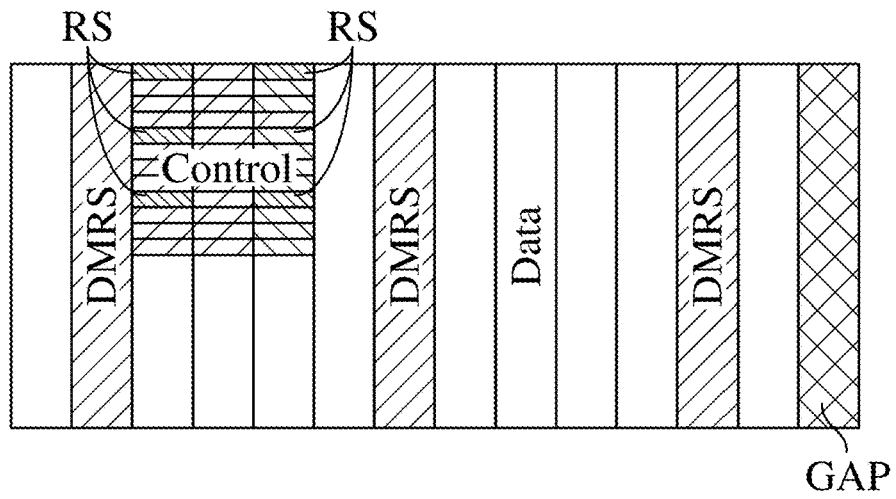
FIGS. 13A-13C illustrate example resource mapping for multi-stage transmission of control information, in accordance with certain aspects of the present disclosure.
Figure 13B:
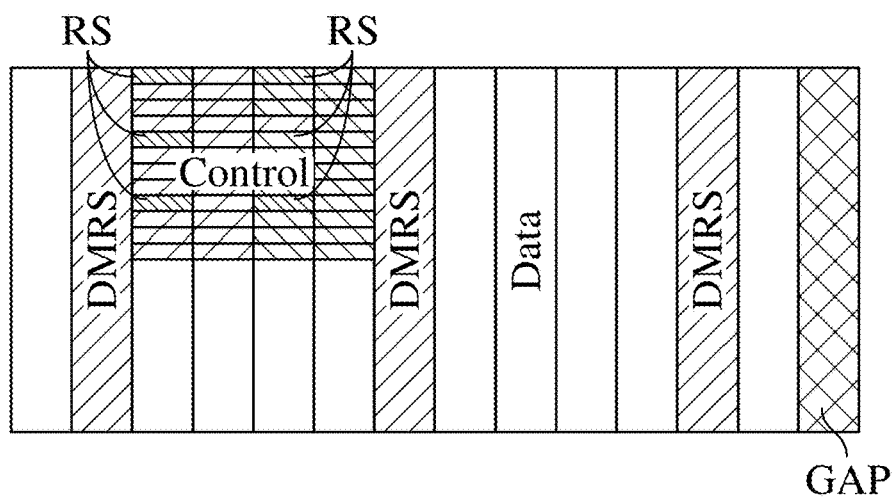
Figure 13C:
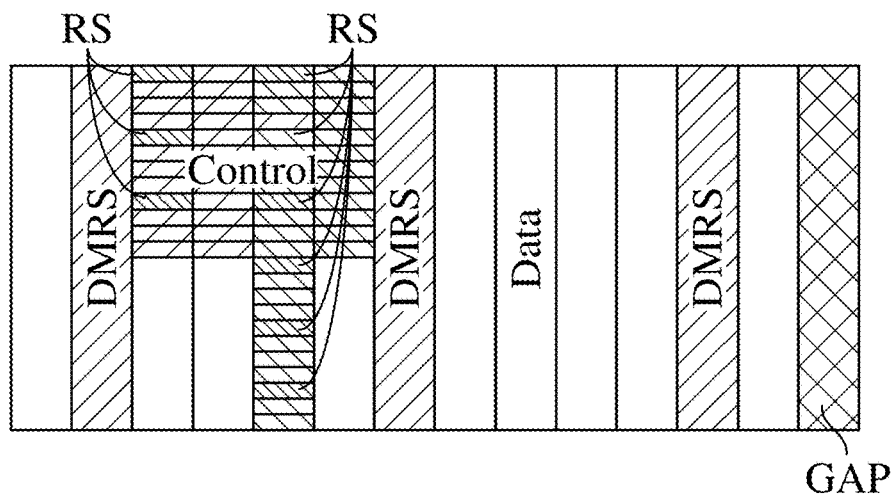

FIGS. 13A-C illustrate other options for when Control B is mapped together with Control A. As illustrated, Control B may have different frequency allocation than Control A. One limitation may be that some combinations may not work (e.g., 10RB data transmission at MCS0 with 3 symbols for Control B with DMRS pattern 2 may not be allowed.). In some cases, the Control B may skip the DMRS location. In this case, the DMRS location or DMRS format should be indicated in the Control A information.

Figure 14:
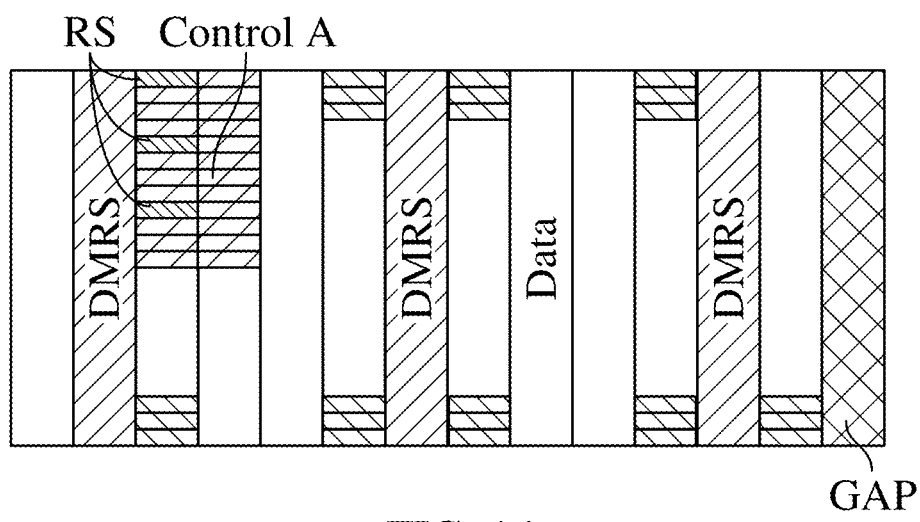
FIG. 14 illustrates example resource mapping for a multi-stage transmission of control information, in accordance with certain aspects of the present disclosure.

FIG. 14 shows another option for Control B mapped information that is similar to UCI multiplexing with PUSCH. The Control B information may be mapped to all layers for the data TB and may have the same modulation as data. In some cases, the RE locations of Control B may need to be specified depending on DMRS pattern density (possible). Control REs may be made more robust than Data REs (e.g., by placing Control REs closer to RS symbols) and/or data may be rate matched (RM) around those REs. This approach may have an advantage in that control can be made to follow data link budget. RE overheads are smaller (albeit at a cost in terms of latency depending on control RE location).

There are various other options for the two stage control proposed herein. For example, the first stage may include all relevant information for broadcast traffic, such that receivers of broadcast traffic would not have to decode the second stage.

Second stage control information may be transmitted in a similar fashion as data, such that DMRS, channel estimation, number of layers, precoding, and the like, are all performed in a similar fashion as data.

There may be multiple formats for the first stage, for example, with RSRP instead of distance for example may be two formats. There may be multiple formats for each traffic type for second stage as well (e.g., with Zone ID present/absent, RSRP/distance, feedback information).

The first stage may not always be accompanied by the second stage. For example, for reservation signals only, there may be no need for a second stage. The first stage may also be used for pre-emption or unbooking of reserved resources. Reserved resources can also be released by transmission of only the first stage.

In some cases, Control A may be configured to be transmitted with a certain periodicity. In some cases, single Control A may be associated with multiple Control B transmissions.

In some cases, certain devices (e.g., RSU/Group leader transmissions) may send Control A transmissions. For example, Control A may be transmitted by RSU or group leader (not associated with a single Control B). Other (member) UEs may transmit on the reserved resources (reserved by Control A) and transmit only Control B. Thus, multiple member UEs may transmit Control B resulting a one-to-many mapping of Control A to Control B transmissions.

Control B transmissions may also occur on their own, for example, with the implicit association to a Control A that has been transmitted in the past. They may also occur on their own for retransmissions of the same packet.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: A method for wireless communications by a peer device, comprising: generating control information to schedule peer-to-peer communication, wherein the control information comprises a first portion with a first set of data and a second portion with a second set of data; transmitting the first portion of the control information in a first stage using first time and frequency resources, wherein the first portion indicates a control information format of the second portion; and transmitting the second portion of the control information in a second stage using second time and frequency resources and the indicated control information format.

Embodiment 2: The method of embodiment 1, wherein the first portion is transmitted in a control channel comprising a physical sidelink control channel (PSCCH).

Embodiment 3: The method of any of embodiments 1 and 2, wherein the first set of data comprises information that indicates assignments of resources for the peer-to-peer communication; and the second set of data comprises at least one of hybrid automatic repeat request (HARQ) process identification (ID), source ID, destination ID, new data indicator (NDI), or redundancy version ID (RVID).

Embodiment 4: The method of any of embodiments 1 and 2, the first set of data comprises at least one of: a periodicity if same resources are reserved for periodic peer-to-peer communication; or a quality of service (QoS) or priority of the peer-to-peer communication.

Embodiment 5: The method of any of embodiments 1 and 2, wherein the first set of data comprises a reference signal (RS) pattern for the second time and frequency resources.

Embodiment 6: The method of any of embodiments 1-3, wherein the second set of data comprises at least one of: an identifier indicating one or more intended recipients of traffic; information regarding a location of a transmitter; or an identifier of the transmitter.

Embodiment 7: The method of any of embodiments 1-3, wherein the first and second portions are transmitted with different code rates.

Embodiment 8: The method of embodiment 7, wherein the first portion is transmitted with a fixed code rate; and the second portion is transmitted with a code rate that varies.

Embodiment 9: The method of any of embodiments 1 and 8, wherein transmission of the second portion is multiplexed with data transmission; and the second portion and the data transmission share at least one of: demodulation reference signals (DMRS), channel estimation, number of layers, or precoding.

Embodiment 10: The method of any of embodiments 1, 8, and 9, wherein the control information format is one of a plurality of control information formats, the control information format being based on a casting type of the peer-to-peer communication.

Embodiment 11: The method of embodiment 10, wherein based on the control information format indicating a groupcast type, the second set of data comprises a zone identifier.

Embodiment 12: The method of any of embodiments 1 and 11, wherein the second set of data included in the second portion of the control information is based on a casting type of the peer-to-peer communication.

Embodiment 13: The method of embodiment 1 and 12, wherein wherein the first and second portions are transmitted using at least one of: different quasi co-location (QCL) assumptions for reference signals (RS); or different precodings for RS.

Embodiment 14: A method for wireless communications by a peer device, comprising: receiving, in a first stage using first time and frequency resources, a first portion of control information to schedule peer-to-peer communication, the first portion including a first set of data and an indication of a control information format of a second portion of the control information; and receiving, in a second stage using second time and frequency resources and the indication of the control information format, the second portion of the control information, the second portion comprising a second set of data.

Embodiment 15: The method of embodiment 14, wherein the first portion is transmitted in a control channel comprising a physical sidelink control channel (PSCCH).

Embodiment 16: The method of any of embodiments 14 and 15, wherein: the first set of data comprises information that indicates assignments of resources for the peer-to-peer communication; and the second set of data comprises at least one of hybrid automatic repeat request (HARM) process identification (ID), source ID, destination ID, new data indicator (NDI), or redundancy version ID (RVID).

Embodiment 17: The method of any of embodiments 14 and 15, wherein the first set of data comprises at least one of: a periodicity if same resources are reserved for periodic peer-to-peer communication; or a quality of service (QoS) or priority of the peer-to-peer communication.

Embodiment 18: The method of any of embodiments 14 and 15, wherein the first set of data comprise a reference signal (RS) pattern for the second time and frequency resources.

Embodiment 19: The method of any of embodiments 14, 15, and 18, wherein the second set of data comprises at least one of: an identifier indicating one or more intended recipients of traffic; information regarding a location of a transmitter; or an identifier of the transmitter.

Embodiment 20: The method of any of embodiments 14, 15, 18, and 19, wherein the first and second portions are transmitted with different code rates.

Embodiment 21: The method of embodiment 20, wherein: the first portion is transmitted with a fixed code rate; and the second portion is transmitted with a code rate that varies.

Embodiment 22: The method of any of embodiments 14 and 21, wherein: transmission of the second portion is multiplexed with data transmission; and the second portion and the data transmission share at least one of: demodulation reference signals (DMRS), channel estimation, number of layers, or precoding.

Embodiment 23: The method of any of embodiments 14, 21, and 22, wherein the control information format is one of a plurality of control information formats, the control information format being based on a casting type of the peer-to-peer communication.

Embodiment 24: The method of embodiment 23, wherein based on the control information format indicating a groupcast type, the second set of data comprises a zone identifier.

Embodiment 25: The method of any of embodiments 14 and 24, wherein the second set of data included in the second portion of the control information is based on a casting type of the peer-to-peer communication.

Embodiment 26: The method of any of embodiments 14, 24, and 25, wherein the first and second portions are transmitted using at least one of: different quasi co-location (QCL) assumptions for reference signals (RS); or precodings for RS.

Embodiment 27: A peer wireless communication device, comprising: a memory; and a processor coupled to the memory, the processor being configured to: generate control information to schedule peer-to-peer communication, wherein the control information comprises a first portion with a first set of data and a second portion with a second set of data; transmit the first portion of the control information in a first stage using first time and frequency resources, wherein the first portion indicates a control information format of the second portion; and transmit the second portion of the control information in a second stage using second time and frequency resources and the indicated control information format.

Embodiment 28: The peer wireless communication device of embodiment 27, wherein the control information format is one of a plurality of control information formats, the control information format being based on a casting type of the peer-to-peer communication.

Embodiment 29: A peer wireless communication device, comprising: a memory; and a processor coupled to the memory, the processor being configured to: receive, in a first stage using first time and frequency resources, a first portion of control information to schedule peer-to-peer communication, the first portion including a first set of data and an indication of a control information format of a second portion of the control information; and receive, in a second stage using second time and frequency resources and the indication of the control information format, the second portion of the control information, the second portion comprising a second set of data.

Embodiment 30: The peer wireless communication device of embodiment 29, wherein the first portion is transmitted in a control channel comprising a physical sidelink control channel (PSCCH).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 266, 258, 264, and/or controller/processor 280 of the UE 120 shown in FIG. 2 may be configured to perform operations 700 of FIG. 7 and/or operations 800 of FIG. 8.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a peer device, comprising:
generating control information to schedule peer-to-peer communication, wherein the control information comprises a first portion with a first set of control information and a second portion with a second set of control information;
transmitting the first portion of the control information in a first stage using first time and frequency resources, wherein the first portion indicates a control information format of the second portion; and
transmitting the second portion of the control information in a second stage using second time and frequency resources and the indicated control information format, wherein code rates for the first and second portions are determined differently, and wherein one of:
content included in the second set of control information varies based on cast type of the peer-to-peer communication; or
the second set of control information comprises information regarding a location of the peer device.

2. The method of claim 1, wherein:
the first portion is transmitted with a first code rate based on a number of symbols carrying the first portion; and
the second portion is transmitted with a second code rate based on a modulation and coding scheme (MCS) of data associated with the control information.

3. The method of claim 1, wherein the second set of control information comprises the information regarding the location of the peer device.

4. The method of claim 1, wherein the second set of control information comprises the information regarding the location of the peer device based on the control information format indicated in the first portion.

5. The method of claim 1, wherein:
the first set of control information comprises information that indicates assignments of resources for the peer-to-peer communication; and
the second set of control information comprises a destination ID.

6. The method of claim 1, wherein the first set of control information indicates a periodicity if same resources are reserved for periodic peer-to-peer communication.

7. The method of claim 1, wherein the first set of control information indicates:
a reference signal (RS) pattern for the second time and frequency resources.

8. The method of claim 1, wherein the second set of control information comprises an identifier indicating one or more intended recipients of traffic.

9. A method for wireless communications by a peer device, comprising:
receiving, in a first stage using first time and frequency resources, a first portion of control information to schedule peer-to-peer communication, the first portion including a first set of control information comprising an indication of a control information format of a second portion of the control information; and
receiving, in a second stage using second time and frequency resources and the indication of the control information format, the second portion of the control information, the second portion comprising a second set of control information, wherein code rates for the first and second portions are determined differently, and wherein one of:
content included in the second set of control information varies based on casti type of the peer-to-peer communication; or
the second set of control information comprises information regarding a location of a transmitter.

10. The method of claim 9, wherein:
the first portion is received having a first code rate based on a number of symbols carrying the first portion; and
the second portion is received having a second code rate based on a modulation and coding scheme (MCS) of data associated with the control information.

11. The method of claim 9, wherein the second set of control information comprises the information regarding the location of the transmitter.

12. The method of claim 9, wherein the second set of control information comprises the information regarding the location of the transmitter based on the control information format indicated in the first portion.

13. The method of claim 9, wherein:
the first set of control information comprises information that indicates assignments of resources for the peer-to-peer communication; and
the second set of control information comprises a destination ID.

14. The method of claim 9, wherein the first set of control information indicates a periodicity if same resources are reserved for periodic peer-to-peer communication.

15. The method of claim 9, wherein the first set of control information indicates:
a reference signal (RS) pattern for the second time and frequency resources.

16. The method of claim 9, wherein the second set of control information comprises an identifier indicating one or more intended recipients of traffic.

17. A peer wireless communication device, comprising:
a memory; and
a processor coupled to the memory, the processor and the memory being configured to:
generate control information to schedule peer-to-peer communication, wherein the control information comprises a first portion with a first set of control information and a second portion with a second set of control information;
transmit the first portion of the control information in a first stage using first time and frequency resources, wherein the first portion indicates a control information format of the second portion; and
transmit the second portion of the control information in a second stage using second time and frequency resources and the indicated control information format, wherein code rates for the first and second portions are determined differently, and wherein one of:

content included in the second set of control information varies based on cast type of the peer-to-peer communication; or the second set of control information comprises information regarding a location of the peer wireless communication device.

18. The peer wireless communication device of claim 17, wherein:

the first portion is transmitted with a first code rate based on a number of symbols carrying the first portion; and the second portion is transmitted with a second code rate based on a modulation and coding scheme (MCS) of data associated with the control information.

19. The peer wireless communication device of claim 17, wherein the second set of control information comprises the information regarding the location of the peer wireless communication device.

20. The peer wireless communication device of claim 17, wherein the second set of control information comprises the information regarding the location of the peer wireless communication device based on the control information format indicated in the first portion.

21. The peer wireless communication device of claim 17, wherein:

the first set of control information comprises information that indicates assignments of resources for the peer-to-peer communication; and the second set of control information comprises a destination ID.

22. A peer wireless communication device, comprising:

a memory; and a processor coupled to the memory, the processor and the memory being configured to:

receive, in a first stage using first time and frequency resources, a first portion of control information to schedule peer-to-peer communication, the first portion including a first set of control information comprising an indication of a control information format of a second portion of the control information; and receive, in a second stage using second time and frequency resources and the indication of the control information format, the second portion of the control information, the second portion comprising a second set of control information, wherein code rates for the first and second portions are determined differently, and wherein one of:

content included in the second set of control information varies based on cast type of the peer-to-peer communication; or the second set of control information comprises information regarding a location of a transmitter.

23. The peer wireless communication device of claim 22, wherein:

the first portion is received having a first code rate based on a number of symbols carrying the first portion; and the second portion is received having a second code rate based on a modulation and coding scheme (MCS) of data associated with the control information.

24. The peer wireless communication device of claim 22, wherein the second set of control information comprises the information regarding the location of the transmitter.

25. The peer wireless communication device of claim 22, wherein the second set of control information comprises the information regarding the location of the transmitter based on the control information format indicated in the first portion.

26. The peer wireless communication device of claim 22, wherein:

the first set of control information comprises information that indicates assignments of resources for the peer-to-peer communication; and the second set of control information comprises a destination ID.

\* \* \* \* \*